April 17, 1951 J. R. COSBY 2,549,667
TRIGGER CIRCUIT
Filed Aug. 8, 1946 2 Sheets-Sheet 1

Inventor
JAMES R. COSBY
By George V. Ellgloth
Agent

April 17, 1951 J. R. COSBY 2,549,667

TRIGGER CIRCUIT

Filed Aug. 8, 1946 2 Sheets-Sheet 2

Inventor
JAMES R. COSBY

By George V. Eltgroth
Agent

Patented Apr. 17, 1951 2,549,667

UNITED STATES PATENT OFFICE 2,549,667

TRIGGER CIRCUIT

James R. Cosby, Towson, Md., assignor to Bendix Aviation Corporation, Baltimore, Md., a corporation of Delaware Application August 8, 1946, Serial No. 689,109

6 Claims. (Cl. 315—229)

This invention relates to circuits incorporating gaseous electric discharge tubes and more particularly to a trigger circuit of this variety adapted to respond to initiating and restoring voltage pulses.

Circuits adapted to be triggered in response to initiating and restoring pulses are known in which a pair of gaseous electric discharge devices have their anode circuits connected through individual resistors to an anode supply circuit and the two anodes are connected by a commutating capacitor. By virtue of this arrangement, when one of the discharge devices becomes conductive the anode of the other is driven negative, removing the ions giving rise to inter-electrode space conductivity in the latter discharge device or valve, thus interrupting the flow of current therethrough. Such circuits operate quite satisfactorily so long as no impedance is introduced in the cathode circuit.

There are applications, however, where a triggered pulse of positive rather than negative polarity is required. The anode circuit pulses in the above described circuit are of negative polarity and must be passed through a polarity reversing amplifier to secure the desired polarity relationship between initiating impulse and the triggered pulse. A positive polarity may be derived by the insertion of an impedance in the cathode circuit but it has been found that the insertion of such an impedance prevents the reliable extinction of one tube by the other, forcing continued recourse to the more expensive alternative of a polarity reversing amplifier.

Accordingly it is an object of the invention to provide new and novel means for eliminating the detrimental effect of cathode impedance in back to back coupled triggered gaseous discharge valves.

It is a further object of the invention to provide new and novel means for deriving positive output pulses from a triggered combination of gaseous discharge valves.

It is a further object of the invention to provide new and novel means for the derivation of positive cathode pulses from circuits including gaseous electric discharge valves.

Other objects and advantages of the invention will in part be described and in part be obvious when the following specification is read in conjunction with the drawings in which.

Figure 1:
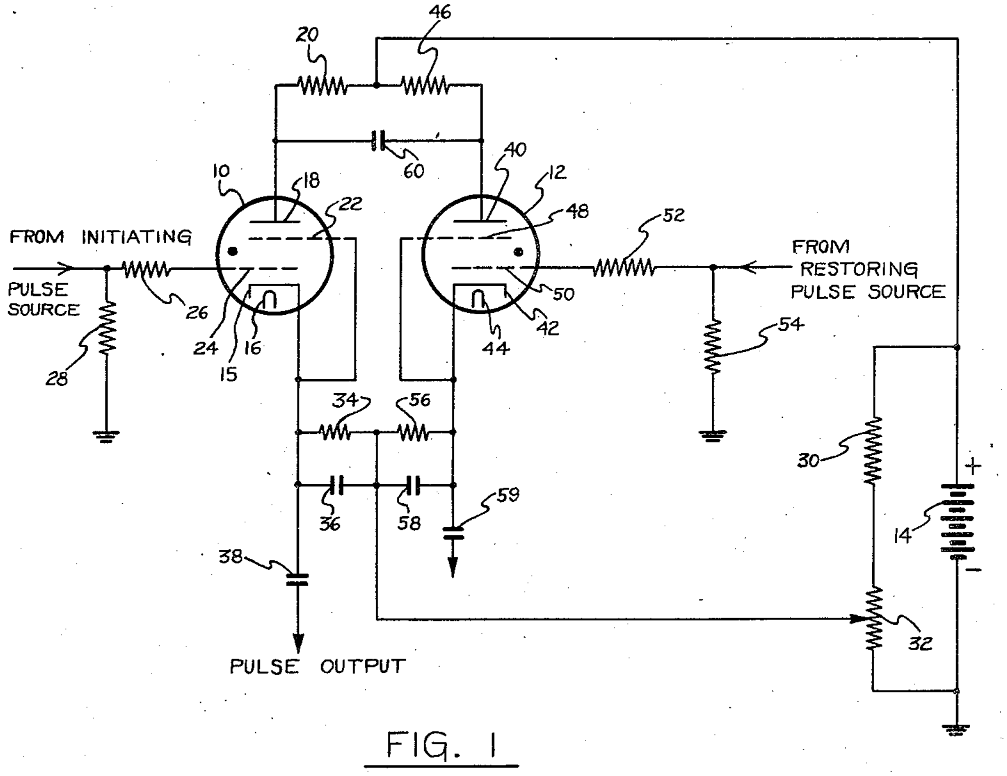
Figure 1 is a schematic representation of a circuit embodying an improved cathode loaded circuit for gaseous electric discharge valves.

Referring now to the drawings the schematic diagram of Figure 1, illustrates a pair of gaseous electric discharge devices 10, 12 connected with an anode voltage source 14. The discharge devices 10, 12 are of the type generally referred to as thyratrons and are characterized by the fact that the mean free path of an electron in the evacuated space between the electrodes is small enough to permit several ionizing collisions during a single transit. The cathodes of these devices are brought to a temperature at which suitable thermionic emission is attained by energization of associated heaters indicated in the drawings. As the exciting circuits for these heaters are conventional, the drawings have not been further complicated by their inclusion.

The discharge device 10 is provided with a cathode 15 having an associated heater 16. An anode 18 is spaced from the cathode 15 and connected through resistor 20 with the positive pole of the anode source 14. There are situated intermediate cathode 15 and anode 18 a shield grid 22 connected with cathode 15 and a control grid 24 which affords a means of controlling the initiation of the inter-electrode discharge. The pulses controlling the initiation of the discharge are applied to grid 24 through limiting resistor 26 shunted to ground by resistor 28 at the end remote from grid 24.

The negative terminal of source 14 is grounded and the source 14 itself is connected to a voltage divider including resistor 30 in series with the winding of a potentiometer 32. The anode circuit of the discharge device 10 is completed by the connection of cathode 15 to the movable tap of potentiometer 32 through the cathode resistor 34 which is shunted by a capacitor 36 the purpose of which is later to be explained in detail. Voltage pulses derived from the cathode 15 are impressed on any desired utilization circuit via the cathode output coupling capacitor 38.

The anode 40 of discharge device 12 is similarly situated remotely from a thermionic cathode 42 with its associated heater 44 and connected to the positive pole of source 14 through the anode resistor 46. A shield grid 48 and control grid 50 are interposed between anode 40 and cathode 42, the shield grid 48 being connected directly to cathode 42 while the control grid 50 is connected with a source of restoring impulses through resistor 52 grounded at its far end through resistor 54. The anode circuit for discharge valve 12 is completed by the connection of cathode resistor 56 to the movable arm of potentiometer 32. Cathode resistor 56 is also shunted by a capacitor 58. Anodes 18 and 40 are connected by a capacitor 60, often referred to as a commutating capacitor. In a representative arrangement discharge devices commercially identified as type 2050 tubes have been successfully employed, with a value of 250,000 ohms for anode resistors 20 and 46 and a capacitor of 0.1 mfd. serving as the commutating capacitor 60. The cathode resistors 34 and 56 in this typical case had a value of 10,000 ohms and were shunted by capacitors 36 and 58 of 0.005 mfd. It has been found that the time constant (RC product) of the cathode resistor and capacitors is preferably greater than $2 \times 10^{-6}$ and that the time constant of the anode circuit should be greater than this, the ratio for optimum operation being in the neighborhood of the ratio of anode resistor voltage drop to cathode resistor voltage drop.

Figure 2:
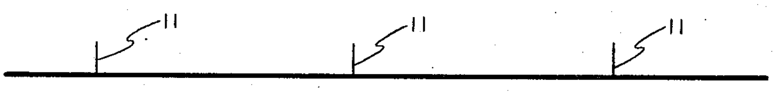
Figure 2 is a graphic portrayal of a representative initiating pulse input.
Figure 3:
Figure 3 is a graphic portrayal of a representative restoring impulse input.

The conventional Eccles-Jordan circuit is substantially identical with the above described circuit with the exception of the fact that it incorporates no cathode resistor. Such a circuit is characterized by the fact that it responds in trigger-like fashion to an initiating impulse but is non-responsive to subsequently occurring similar impulses until the circuit has been reset by a restoring impulse. The voltages encountered in such a circuit are those of Figures 2, 3 and 4 in which Figure 2 illustrates the initiating impulses 11 applied to grid 24 and Figure 3 illustrates the restoring pulses 13 applied to control grid 50. In the conventional Eccles-Jordan circuit, upon receipt of an initiating impulse a discharge is initiated in discharge device 10 dropping the anode voltage abruptly as at 62 in Figur 4 to its steady arc value 64 in Figure 4. Capacitor 60 is now charged to a voltage equal to the voltage drop occurring at resistor 20. Upon the application of a restoring pulse to control grid 50 an inter-electrode discharge is initiated, abruptly reducing the anode potential on tube 12. This occurs within such a short interval that the charge on commutating capacitor 60 does not change appreciably and the subsequent charge equalization develops a negative potential across resistor 20 as indicated by the down stroke 66 and charging curve 68. This, it will be seen, drives anode 18 negative with response to cathode 15, which in the conventional circuit is connected directly to the ground, sweeping the inter-electrode space free of positive ions and preparing the tube 10 for response to a later occurring initiating impulse.

Figure 4:
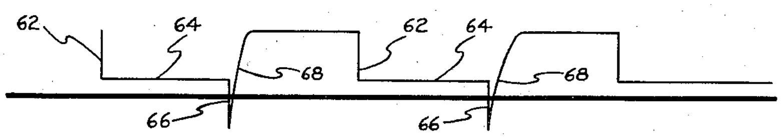
Figure 4 illustrates the anode excursion to be found in conventional circuits devoid of cathode loading.
Figure 5:
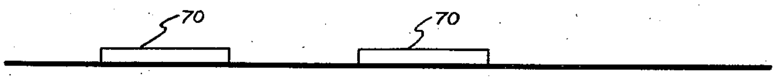
Figure 5 is a graphic illustration of the cathode voltage pulses resulting from the insertion of cathode circuit resistance.
Figure 6:
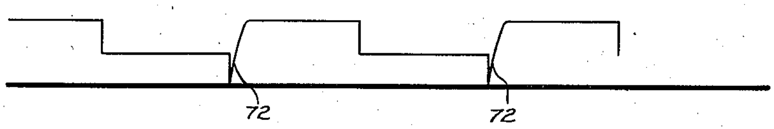
Figure 6 illustrates the anode-cathode voltage excursion in the absence of the novel corrective measures.
Figure 7:
Figure 7 illustrates the cathode voltage pulses resulting from the application of appropriate corrective measures.
Figure 8:
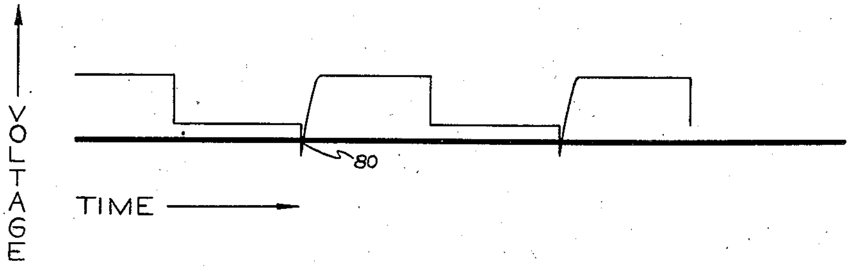
Figure 8 illustrates graphically the anode-cathode voltage excursion after the application of such corrective measures.

From Figure 4 it is apparent that the only abruptly occurring impulses in the conventional Eccles-Jordan trigger circuit have a negative polarity. There are many applications in which a pulse of positive polarity is required and such a pulse may be developed by the insertion of a resistor in the cathode circuit of at least one of the discharge devices. The insertion of cathode resistor 34 in series with discharge device 10 gives rise to a cathode voltage pulse of the form shown at 70 in Figure 5. Unfortunately, however, when such a resistance is introduced, the reliability of triggering and reset are greatly impaired. That this must be so will be obvious from an inspection of Figure 6 showing the anode-cathode potentials developed in the presence of such operating conditions. The initiating pulse 11 fires the tube 10 as previously but, due to the presence of the cathode resistor 34, the voltage drop across anode resistor 20 is reduced, thus reducing the potential to which capacitor 60 is charged. Upon the application of a restoring pulse 13 to the discharge device 12 several events now transpire or at least tend to transpire. A negative pulse is impressed on anode 18 but this negative pulse is no longer as great as that occurring in the absence of a cathode resistor. This negative pulse reduces the current through the discharge device 10 practically to zero and hence the voltage drop across cathode resistor 34 vanishes. The combination of the elimination of positive cathode voltage and the reduced commutating potential so alter conditions that the anode is now never driven negative with respect to its associated cathode which is evident at 72 and hence ion clean-up in the inter-electrode space is not attained. This is due to the fact that the voltage drop across the cathode resistor immediately disappears upon the cessation of current flow therethrough. It has been found, however, that the connection of a capacitor in parallel or shunt with the cathode resistor prevents the immediate disappearance of the cathode voltage. The wave form of the cathode circuit pulse then changes to that shown at 74 in Figure 7, in which the cathode voltage decays at an exponential rate determined by the time constant of the cathode resistor and its shunting capacitor. Hence, the cathode voltage is held positive for a brief instant of time while the anode swings to a less positive potential, thus developing a net negative anode-cathode voltage as illustrated at 80 in Figure 8.

Figure 9:
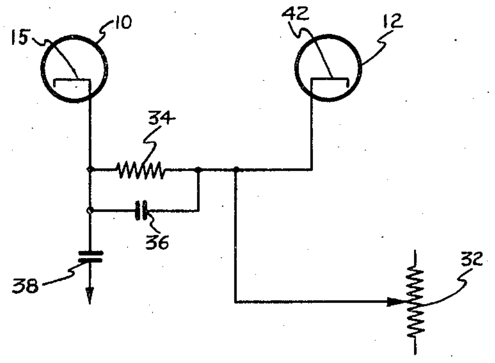
Figure 9 illustrates an alternative form of cathode circuit applicable when pulses from only one cathode are desired.
Figure 10:
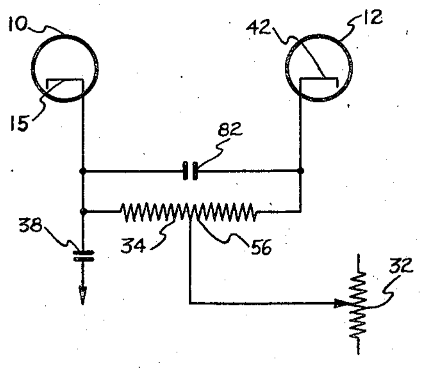
Figure 10 illustrates still another alternative form of cathode circuit which may be employed where cathode pulses of alternating polarity are not objectionable.

When only single pulses are desired it will suffice to place a resistor in only one cathode circuit, as shown in Figure 9, and when double alternating pulses are required the capacitors 36 and 58 may be replaced by a single capacitor 82 equivalent to their series combination.

Because of the finite time required to eliminate ions from the inter-electrode space it has been found that the minimum time constant of the cathode circuit should not be less than about 2 micro-seconds, and because of the greater range through which the potential of the commutating capacitor 60 varies, the anode circuit time constant should be greater preferably in the ratio of anode resistance voltage drop to cathode resistor voltage drop.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced thereby.

What is claimed and desired to be secured by United States Letters Patent is:

1. In a trigger circuit, a pair of gaseous electric discharge tubes each of which includes a cathode, a control electrode and an anode; means including a resistance for connecting each anode to a source of positive potential; means including a resistance for connecting each cathode to a source of negative potential, means including a coupling capacitor connected to each cathode for deriving a voltage pulse therefrom; a condenser connected between the anodes; means for impressing upon the control electrodes phase displaced positive impulses whereby the discharge tubes will be rendered alternatively conductive whereby positive impulses are produced across the cathode resistance of each tube; and means for rendering the tubes alternately non-conductive comprising a condenser connected between said cathodes for delaying the decay of the potential drop across the cathode resistance of the conductive tube simultaneously with the initiation of conductivity of the non-conductive tube, the time constant of each cathode resistance-capacitance circuit being greater than the deionization time of its associated tube.

2. The combination defined in claim 1 wherein the capacitance of the cathode connecting condenser is of such a magnitude that the product of its value in farads and the sum of the resistance of the cathode resistors in ohms is greater than $2\times10^{-6}$.

3. The combination defined in claim 2 wherein the capacitance of the anode connecting condenser is of such a magnitude that the product of its value in farads and the sum of the resistance of the anode resistors in ohms is greater than said product of the cathode condenser capacitance and the sum of the resistance of the cathode resistors.

4. In a trigger circuit, a first and a second gaseous electric discharge tube each of which includes a cathode, a control electrode and an anode; means including a resistance for connecting each anode to a source of positive potential; means for connecting each cathode to a source of negative potential including a resistor in series with the cathode of said first tube means including a coupling capacitor connected to the cathode of said first tube for deriving a voltage pulse therefrom; a condenser connected between the anodes; means for impressing upon the control electrodes phase displaced positive impulses whereby the tubes will be rendered alternatively conductive whereby positive impulses are produced across said cathode resistor; and means for rendering said first tube alternatively non-conductive comprising a condenser across said cathode resistor for delaying the decay of the potential drop across said cathode resistor simultaneously with the initiation of conductivity of said second tube, the time constant of the cathode resistance-capacitance circuit being greater than the de-ionization time of said first tube.

5. The combination defined in claim 4 wherein the capacitance of the condenser across said cathode resistor is of such a magnitude that the product of its value in farads and the resistance of said cathode resistor in ohms is greater than $2\times10^{-6}$.

6. The combination defined in claim 5 wherein the capacitance of the anode connecting condenser is of such a magnitude that the product of its value in farads and the sum of the resistance of the anode resistors in ohms is greater than said product of the capacitance of said cathode resistor shunting condenser and the resistance of said cathode resistance.

JAMES R. COSBY.

REFERENCES CITED

The following references are of record in the file of this patent:

UNITED STATES PATENTS

| Number | Name | Date |
|---|---|---|
| 1,929,722 | Willis | Oct. 10, 1933 |
| 2,292,100 | Bliss | Aug. 4, 1942 |
| 2,365,450 | Bliss | Dec. 19, 1944 |